(12) United States Patent
Morita et al.

(10) Patent No.: US 11,891,506 B2
(45) Date of Patent: Feb. 6, 2024

(54) SEALANT SHEET

(71) Applicant: NITTO DENKO CORPORATION, Ibaraki (JP)

(72) Inventors: Kosuke Morita, Ibaraki (JP); Kazuhiro Kitayama, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 400 days.

(21) Appl. No.: 16/767,844

(22) PCT Filed: Nov. 29, 2018

(86) PCT No.: PCT/JP2018/043951
§ 371 (c)(1),
(2) Date: May 28, 2020

(87) PCT Pub. No.: WO2019/107486
PCT Pub. Date: Jun. 6, 2019

(65) Prior Publication Data
US 2020/0291184 A1 Sep. 17, 2020

(30) Foreign Application Priority Data
Nov. 29, 2017 (JP) .................. 2017-228841

(51) Int. Cl.
| | | |
|---|---|---|
| C08L 63/04 | (2006.01) | |
| C09K 3/10 | (2006.01) | |
| C08G 75/14 | (2006.01) | |
| C08G 59/06 | (2006.01) | |
| C08G 59/38 | (2006.01) | |

(52) U.S. Cl.
CPC ............ *C08L 63/04* (2013.01); *C09K 3/1012* (2013.01); *C08G 59/066* (2013.01); *C08G 59/38* (2013.01); *C08G 75/14* (2013.01)

(58) Field of Classification Search
None
See application file for complete search history.

(56) References Cited

U.S. PATENT DOCUMENTS

| 3,476,826 | A | * | 11/1969 | Millen | C08G 75/14 |
| --- | --- | --- | --- | --- | --- |
| | | | | | 528/901 |
| 4,267,307 | A | | 5/1981 | Louthan et al. | |
| 5,464,225 | A | | 11/1995 | Uematsu et al. | |
| 5,663,219 | A | | 9/1997 | Chokshi et al. | |
| 6,596,200 | B1 | | 7/2003 | Ogawa et al. | |

(Continued)

FOREIGN PATENT DOCUMENTS

| JP | 04-320478 A | 11/1992 |
|---|---|---|
| JP | 08-195190 A | 7/1996 |

(Continued)

OTHER PUBLICATIONS

International Search Report for PCT/JP2018/043951 dated Feb. 19, 2019 [PCT/ISA/210].

(Continued)

*Primary Examiner* — Megan McCulley
(74) *Attorney, Agent, or Firm* — Sughrue Mion, PLLC

(57) ABSTRACT

Provided is a sealant sheet formed as a sheet. The sealant sheet comprises an epoxy group-containing polysulfide. The epoxy group-containing polysulfide has a disulfide structure and an epoxy group in its molecule.

12 Claims, 1 Drawing Sheet

(56) References Cited

U.S. PATENT DOCUMENTS

| | | |
|---|---|---|
| 2003/0050511 A1 | 3/2003 | Gilmore et al. |
| 2013/0130038 A1 | 5/2013 | Woudsma |
| 2014/0010983 A1* | 1/2014 | Gorodisher ............ C08G 75/14 528/96 |
| 2014/0336340 A1 | 11/2014 | Suga et al. |
| 2015/0065599 A1 | 3/2015 | Kralev et al. |
| 2018/0030322 A1 | 2/2018 | Bons et al. |
| 2018/0194979 A1* | 7/2018 | Cui ........................ C09J 181/02 |
| 2019/0031931 A1 | 1/2019 | Kitayama et al. |
| 2021/0122958 A1 | 4/2021 | Morita |

FOREIGN PATENT DOCUMENTS

| | | |
|---|---|---|
| JP | 08-217854 A | 8/1996 |
| JP | 2001-522910 A | 11/2001 |
| JP | 2001-335689 A | 12/2001 |
| JP | 3442860 B2 | 9/2003 |
| JP | 2006-526693 A | 11/2006 |
| JP | 2008-530270 A | 8/2008 |
| JP | 4227787 B2 | 2/2009 |
| JP | 2013-119519 A | 6/2013 |
| JP | 2014-532801 A | 12/2014 |
| JP | 2017-145276 A | 8/2017 |
| WO | 99/24491 A1 | 5/1999 |
| WO | 2005/000965 A1 | 1/2005 |
| WO | 2006/086211 A1 | 8/2006 |
| WO | 2013/067963 A1 | 5/2013 |
| WO | 2013/089000 A1 | 6/2013 |

OTHER PUBLICATIONS

Extended European Search Report dated Jun. 30, 2021 from the European Patent Office in Application No. 18882496.5.
First Office Action dated Oct. 10, 2022 from the China National Intellectual Property Office in CN Application No. 201880077128.4.
Notice of Reasons for Refusal dated Oct. 13, 2022 from the Japanese Patent Office in JP Application No. 2019-557318.
Extended European Search Report dated Mar. 21, 2022 in European Application No. 19827579.4.
International Search Report of PCT/JP2019/025446 dated Oct. 1, 2019 [PCT/ISA/210].
Non-Final Office Action dated Aug. 16, 2023 by the United States Patent and Trademark Office in U.S. Appl. No. 17/254,951.
Communication dated Jan. 31, 2023 from the European Patent Office in European Application No. 19827579.4.
Notification of First Office Action dated Feb. 10, 2023 in Chinese Application No. 201980043243.4.

* cited by examiner

SEALANT SHEET

CROSS REFERENCE TO RELATED APPLICATIONS

This application is a National Stage of International Application No. PCT/JP2018/043951 filed Nov. 29, 2018, claiming priority based on Japanese Patent Application No. 2017-228841 filed Nov. 29, 2017; the entire contents thereof are incorporated herein by reference.

TECHNICAL FIELD

The present invention relates to a sealant as a sheet, that is, a sealant sheet.

BACKGROUND ART

Liquid polysulfide includes —S—S— bonds in the molecule; and therefore, when allowed to cure, it can form a rubbery cured material having excellent resistance to oil such as jet fuel and hydraulic oil (oil resistance). Accordingly liquid polysulfide is used as a sealant material for aircrafts, for example. Technical documents on liquid polysulfide include Patent Documents 1 to 3. Patent Documents 4 and 5 relate to aircraft sealants and aerospace sealants, but not to a polysulfide-based sealant. Patent Document 6 is a technical document on a polysulfide-based pressure-sensitive adhesive tape.

CITATION LIST

Patent Literature

[Patent Document 1] Japanese Patent No. 4227787
[Patent Document 2] Japanese Patent No. 3442860
[Patent Document 3] Japanese Patent Application Publication No. 2013-119519
[Patent Document 4] Japanese Patent Application Publication No. 2006-526693
[Patent Document 5] Japanese Patent Application Publication No. 2008-530270
[Patent Document 6] Japanese Patent Application Publication No. 2017-145276

SUMMARY OF INVENTION

Technical Problem

A liquid polysulfide sealant is put on by mixing liquid A containing liquid polysulfide and liquid B containing a curing agent for the polysulfide immediately before the application to prepare a liquid sealant, applying the liquid sealant to a target object and allowing it to cure on the target object. As the curing agent, strong oxidizing agents such as dichromic acid are often used as they can allow the curing reaction to readily proceed at room temperature.

With such a liquid sealant, however, because it is in a liquid form, it is difficult to achieve a precise application of a desired thickness in a desired area of the target object. Thus, even for a skilled worker, there is a limit to reducing the time required for application of liquid sealant. There are also concerns about increased manufacturing costs, decreased productivity and degraded sealing quality, arising from difficulties in training and securing workers.

In view of such circumstances, an objective of this invention is to facilitate application of a polysulfide-based sealant.

Solution to Problem

To achieve the objective, this description provides a sealant sheet formed as a sheet (a sheet formed of a sealant), a sealant sheet. The sealant sheet comprises an epoxy group-containing polysulfide having a disulfide structure (disulfides) and an epoxy group in the molecule.

The sealant sheet is easily handled because of its sheet form and can be easily placed in a desired area. Because the sealant sheet includes the epoxy group-containing polysulfide, it can be cured after placed in the desired area to increase the strength (e.g. breaking strength). The cured sealant thus formed (cured product of the sealant sheet) may show excellent oil resistance due to the polysulfide structure. Because the thickness of the cured material can be controlled with the thickness of the sealant sheet being used, its application does not require adjustment of coating thickness as in application of a liquid sealant. Thus, according to the sealant sheet, a polysulfide-based sealant can be easily applied with precision.

The sealant sheet preferably has a storage modulus of 0.005 MPa or greater and 0.8 MPa or less at 25° C. With the sealant sheet having a storage modulus in this range, a suitable balance can be easily achieved between tightness of adhesion to the target object and retention stability of the sheet shape.

The sealant sheet may have a thickness of, for instance, 0.01 mm or greater and 10 mm or less. The art disclosed herein can be favorably implemented in an embodiment of sealant sheet having such a thickness.

In some embodiments, the epoxy group-containing polysulfide may be a reaction product of an epoxy compound having two or more epoxy groups in one molecule and a thiol-terminated polysulfide (polysulfide having a thiol group at each terminus) having a weight average molecular weight of 500 to 10000 with the disulfide structure in the main chain. According to the sealant sheet in such an embodiment, a cured sealant can be formed, well-balanced in strength and stretchiness.

The epoxy compound may include a bifunctional epoxy compound. The sealant sheet in such an embodiment readily forms a cured sealant that shows suitable stretchiness.

The bifunctional epoxy compound can be, for instance, an epoxy compound having a five-membered or larger carbon ring structure in the molecule. The sealant sheet in such an embodiment readily forms a cured sealant having high strength and good stretching properties.

The epoxy compound may comprise a trifunctional or higher polyfunctional epoxy compound. The use of the trifunctional or higher polyfunctional epoxy compound can increase the strength of the cured sealant formed from the sealant sheet disclosed herein.

As the polyfunctional epoxy compound, for instance, a novolac-based epoxy resin can be preferably used. The sealant sheet in such an embodiment readily forms a cured sealant having high strength and good stretching properties.

The sealant sheet disclosed herein can comprise a filler. The use of filler may improve either or both of the strength and the stretchiness of the cured sealant.

The sealant sheet prior to use (i.e. before placed in a desired area) may be in a form of release-lined sealant sheet comprising the sealant sheet and a release liner having a release face in contact with at least one face of the sealant sheet. The sealant sheet in such an embodiment is preferable from the standpoint of its preservability and ease of handling during its transportation, processing, placement in a desired area, etc.

The scope of the invention for which the present patent application seeks patent protection may include a suitable combination of the features described above.

DESCRIPTION OF EMBODIMENTS

Figure 1:
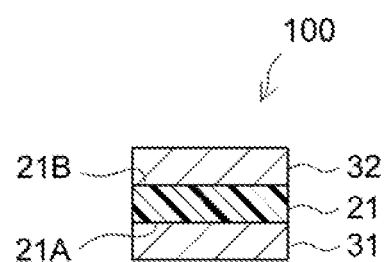
FIG. 1 shows a cross-sectional diagram schematically illustrating a constitutional example of the sealant sheet.

Preferred embodiments of the present invention are described below. Matters necessary to practice this invention other than those specifically referred to in this description can be understood by a person skilled in the art based on the disclosure about implementing the invention in this description and common general knowledge at the time of application. The present invention can be practiced based on the contents disclosed in this description and common technical knowledge in the subject field. In the drawings referenced below, a common reference numeral may be assigned to members or sites producing the same effects, and duplicated descriptions are sometimes omitted or simplified. The embodiments described in the drawings are schematized for clear illustration of the present invention, and do not necessarily represent accurate sizes or reduction scales of the product actually provided.

<Sealant Sheet>

The sealant sheet disclosed herein is pre-formed in a form of a sheet and can be placed in an area to be sealed with it in the sheet form. In this aspect, the sealant sheet is clearly distinct from a liquid sealant (e.g. a liquid sealant prepared by mixing liquid A containing a liquid polysulfide and liquid B containing a curing agent for the polysulfide immediately before application) applied in a liquid form to an area to be sealed. The sealant sheet disclosed herein comprises an epoxy group-containing polysulfide and can be cured by using the epoxy groups in the epoxy group-containing polysulfide. In terms of having such curing properties, the sealant sheet disclosed herein is clearly distinct from the sealant after cured (cured sealant). The sealant sheet disclosed herein is for use where it is placed in an area to be sealed, with it provided as a sealant sheet that is curable having unreacted epoxy groups; and the epoxy groups are then allowed to react in the area to form a cured sealant. It is not intended to be placed as a pre-cured sealant in the area to be sealed.

Figure 2:
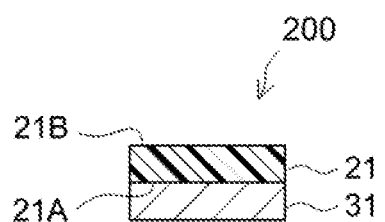
FIG. 2 shows a cross-sectional diagram schematically illustrating another constitutional example of the sealant sheet.

FIGS. 1 and 2 show constitutional examples of the sealant sheet disclosed herein.

In a sealant sheet 21 shown in FIG. 1, one face (first face) 21A and the other face (second face) 21B thereof are protected, respectively, with release liners 31 and 32 each having a release face at least on the sealant sheet 21 side. Sealant sheet 21 in such an embodiment can be thought as a component of a release-lined sealant sheet 100 comprising sealant sheet 21, release liners 31 and 32.

Sealant sheet 21 shown in FIG. 2 has a constitution where one face 21A thereof is protected with release liner 31 having a release face on each side so that, when it is wound, the other face 21B of sealant sheet 21 is brought in contact with and protected also with release liner 31. Sealant sheet 21 in such an embodiment can be thought as a component of a release-lined sealant sheet 200 comprising sealant sheet 21 and release liner 31.

The sealant sheet disclosed herein preferably has shape-holding properties that enable stable retention of the sheet shape at room temperature (e.g. about 25° C.). The shape-holding properties can also be thought as resistance to plastic deformation such as creep deformation. The sealant sheet can have a storage modulus at 25° C. (or simply a "storage modulus" hereinafter) of, for instance, greater than 0.005 MPa, or preferably greater than 0.01 MPa. With increasing storage modulus of the sealant sheet, the handling properties and ease of processing (e.g. ease of cutting, anti-blocking properties, re-workability) of the sealant sheet tend to increase. In some embodiments, the storage modulus of the sealant sheet can be, for instance, 0.05 MPa or greater, 0.1 MPa or greater, or even 0.2 MPa or greater. The maximum storage modulus is not particularly limited. In some embodiments, the storage modulus of the sealant sheet can be, for instance, 2 MPa or less, 1 MPa or less, 0.8 MPa or less, 0.6 MPa or less, 0.5 MPa or less, 0.4 MPa or less, or even 0.3 MPa or less. With decreasing storage modulus of the sealant sheet, the conformability to surface contours in areas to be sealed tends to increase.

The storage modulus is determined at a frequency of 1 Hz at 0.5% strain, using a rheometer. As the rheometer, model name ARES G2 available from TA Instruments Japan, Inc. or a comparable system can be used. More specifically the storage modulus is determined by the method described later in Examples.

As used herein, the storage modulus of the sealant sheet means the storage modulus of the uncured sealant sheet unless otherwise noted and is distinguished from the storage modulus of the cured sealant sheet (cured sealant). As used herein, the storage modulus of the sealant sheet typically means the storage modulus of the sealant sheet prior to use, that is, prior to placement by adhesion, etc., in the area to be sealed.

The thickness of the sealant sheet is not particularly limited and can be selected in accordance with the thickness of the cured sealant to be obtained. From the standpoint of the sealing reliability, etc., in some embodiments, the sealant sheet may have a thickness of, for instance, 0.01 mm or greater, 0.03 mm or greater, 0.05 mm or greater, 0.1 mm or greater, 0.25 mm or greater, or even 0.3 mm or greater. In some embodiments, the sealant sheet may have a thickness of, for instance, 10 mm or less, 5 mm or less, 3 mm or less, or even 2 mm or less. It may be advantageous to reduce the thickness of the sealant sheet from the standpoint of the conformability to surface contours in the area to be sealed, weight reduction, etc.

<Epoxy-Containing Polysulfide>

The sealant sheet disclosed herein includes an epoxy group-containing polysulfide. The epoxy group-containing polysulfide has a disulfide structure (disulfide) represented by —S—S— and an epoxy group. The sealant sheet disclosed herein can be cured, using the epoxy group. Having the disulfide structure, it can form a cured material with excellent oil resistance.

One molecule of the epoxy group-containing polysulfide may include one, two or more disulfides. From the standpoint of the oil resistance of the cured material, it is preferable to use an epoxy group-containing polysulfide having an average of three or more disulfides per molecule. The average number of disulfides per molecule (or the average number of disulfide groups, hereinafter) of the epoxy group-containing polysulfide disclosed herein can be, for instance, 5 or greater, 10 or greater, 15 or greater, or even 20 or greater. The upper limit of the average number of disulfide groups is not particularly limited. From the standpoint of the ease of manufacturing the sealant sheet (e.g. the ease of molding into a sheet form), etc., it can be, for instance, 100 or less, 70 or less, or even 50 or less.

The disulfide structure is preferably in the main chain of the epoxy group-containing polysulfide. When the main chain includes the disulfide structure, the resulting cured material tends to show good stretchiness.

One molecule of the epoxy group-containing polysulfide may include one, two or more epoxy groups. From the standpoint of increasing the strength of the cured material and reducing the curing time, a preferable epoxy group-containing polysulfide includes more than one epoxy group in average per molecule. In some embodiments, the average number of epoxy groups per molecule of the epoxy group-containing polysulfide (or the average number of epoxy groups, hereinafter) in the sealant sheet disclosed herein can be, for instance, 1.3 or greater, 1.5 or greater, 1.8 or greater, 2.0 or greater, or even greater than 2.0. The upper limit of the average number of epoxy groups is not particularly limited. From the standpoint of the flexibility of the cured material, it can be, for instance, 15 or less, 10 or less, 7.0 or less, 5.0 or less, 4.0 or less, or even 3.0 or less.

The epoxy group in the epoxy group-containing polysulfide is preferably located at a terminus of the epoxy group-containing polysulfide. With such an epoxy group-containing polysulfide, the cured material tends to show good stretchiness. The sealant sheet disclosed herein may include either an epoxy group-containing polysulfide having an epoxy group at one terminus of the main chain, an epoxy group-containing polysulfide having an epoxy group at each terminus of the main chain, or both of these. The epoxy group-containing polysulfide having an epoxy group at one terminus of the main chain may have a non-epoxy functional group at a terminus different from the terminus having the epoxy group. The non-epoxy functional group can be, for instance, thiol group, amino group, hydroxy group, etc. The sealant sheet disclosed herein preferably includes at least an epoxy group-containing polysulfide having an epoxy group at each terminus of the main chain. With the inclusion of an epoxy group-containing polysulfide having such a structure, the resulting cured material tends to combine well-balanced strength and stretchiness.

In some embodiments, the epoxy group-containing polysulfide preferably includes a repeat unit represented by the next general formula (1):

$$-R^1-O-R^2-O-R^3-S-S- \qquad (1)$$

Here, $R^1$, $R^2$ and $R^3$ in the general formula (1) are independently an alkylene group with 1 to 4 carbon atoms, preferably an alkylene group with 1 to 3 carbon atoms, or more preferably an alkylene group with 1 or 2 carbon atoms. The repeat unit (1) has a structure in which an ether structure is connected to a disulfide structure. With an epoxy group-containing polysulfide having such a repeat unit (1), the resulting cured material tends to have excellent oil resistance and flexibility. The average number of repeat units (1) per molecule of the epoxy group-containing polysulfide in the sealant sheet disclosed herein can be, for instance, 5 or greater, 10 or greater, 15 or greater, or 20 or greater. The average number can be, for instance, 100 or less, 70 or less, or even 50 or less. The epoxy group-containing polysulfide may have, per molecule, solely one region with successive repeat units (1), or two or more such regions.

In some embodiments, the epoxy group-containing polysulfide may include a structure represented by the next general formula (2):

$$-CH_2-S-CH_2CHOH-R' \qquad (2)$$

Here, R' in the general formula (2) is an organic group having at least one (e.g. about 1 to 5) epoxy group(s). The structure of the general formula (2) can be formed, for instance, by addition reaction between a thiol having a structural moiety represented by $-CH_2-SH$ and an epoxy compound having a substituent group R' on the epoxy ring. The number of structural units represented by the general formula (2) (as the average number per molecule of the epoxy group-containing polysulfide in the sealant sheet disclosed herein) can be, for instance, 1.1 or greater, 1.3 or greater, 1.5 or greater, 1.8 or greater, 2.0 or greater, or even greater than 2.0. The average number can be, for instance, 15 or less, 10 or less, 7.0 or less, or even 5.0 or less.

(Thiol Group-Containing Polysulfide)

The epoxy group-containing polysulfide can be, for instance, a reaction product of a thiol group-containing polysulfide having a disulfide structure and a thiol group in one molecule, and an epoxy compound having two or more epoxy groups in one molecule. The epoxy group-containing polysulfide may be formed by the addition reaction between the thiol group and the epoxy group.

The weight average molecular weight (Mw) of the thiol group-containing polysulfide is not particularly limited. For instance, it can be 500 or higher, 800 or higher, 1000 or higher, above 1000, or even above 2000. A thiol group-containing polysulfide having a higher Mw tends to lead to formation of a sealant sheet that provides a cured material with greater stretchiness. In some embodiments, the Mw of the thiol group-containing polysulfide can be, for instance, above 2500, above 3000, or even above 3500. The Mw of the thiol group-containing polysulfide can be, for instance, 30000 or lower, or even 10000 or lower. From the standpoint of the ease of handling and reactivity with the epoxy compound, in some embodiments, the Mw of the thiol group-containing polysulfide can be, for instance, below 9000, below 8000, below 7500, below 7000, or even below 6500.

The Mw of the thiol group-containing polysulfide can be determined based on polyethylene glycol by gel permeation chromatography (GPC), using tetrahydrofuran (THF) as the mobile phase. Alternatively a nominal value given in a catalog, literature and the like can be used.

The disulfide structure is preferably included in the main chain of the thiol group-containing polysulfide. According to a sealant sheet comprising a reaction product of the epoxy compound and a thiol group-containing polysulfide with a disulfide structure in the main chain, the resulting cured material tends to show good stretchiness. The number of disulfide structures in one molecule of the thiol group-containing polysulfide (as the average number (average number of disulfide groups) of the entire thiol group-containing polysulfide used) can be, for instance, 3 or greater, 5 or greater, 10 or greater, 15 or greater, or even 20 or greater. The upper limit of the average number of disulfide groups is not particularly limited. From the standpoint of the ease of manufacturing the sealant sheet (e.g. the ease of molding into a sheet form), etc., it can be, for instance, 100 or less, 70 or less, or even 50 or less.

One molecule of the thiol group-containing polysulfide may include one, two or more thiol groups. From the standpoint of readily obtaining a sealant sheet suited for increasing the strength of the cured material and reducing the curing time, a preferable thiol group-containing polysulfide includes more than one thiol group in average per molecule. The average number of thiol groups per molecule of the thiol group-containing polysulfide used (or the average number of thiol groups, hereinafter) can be, for instance, 1.1 or greater, 1.3 or greater, 1.5 or greater, 1.8 or greater, 2.0 or greater, or even greater than 2.0. The upper limit of the average number of thiol groups is not particularly limited. From the standpoint of the flexibility of the cured material, it can be, for instance, 15 or less, 10 or less, 7.0 or less, or even 5.0 or less.

The thiol group is preferably placed at a terminus of the thiol group-containing polysulfide. By a reaction of such a thiol group-containing polysulfide and the epoxy compound, an epoxy group-containing polysulfide having a terminal epoxy group can be favorably formed. The thiol group-containing polysulfide used may be a polysulfide having a thiol group at one terminus of the main chain, a polysulfide having a thiol group at each terminus of the main chain, or a mixture of these. It is particularly preferable to use a thiol group-containing polysulfide having a thiol group at each terminus of the main chain. With the inclusion of a thiol group-containing polysulfide having such a structure, the resulting cured material tends to combine well-balanced strength and stretchiness. In some embodiments, of the entire thiol group-containing polysulfide used, the ratio of the thiol group-containing polysulfide having a thiol group at each terminus of the main chain can be, by weight, for instance, above 50%, above 70%, above 90%, above 95%, above 98%, or even essentially 100%.

The thiol group-containing polysulfide having a thiol group at each terminus of the main chain is preferably represented by the next general formula (3):

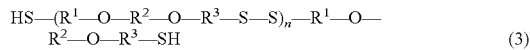

$$HS-(R^1-O-R^2-O-R^3-S-S)_n-R^1-O-R^2-O-R^3-SH \quad (3)$$

$R^1$, $R^2$ and $R^3$ in the general formula (3) are independently an alkylene group with 1 to 4 carbon atoms, preferably an alkylene group with 1 to 3 carbon atoms, or more preferably an alkylene group with 1 or 2 carbon atoms. In the general formula (3), n can be an integer selected so that the compound of the general formula (3) has a formula weight in a range of, for instance, 500 or higher and 10000 or lower, 800 or higher below 9000, 1000 or higher below 8000, above 1000 and below 8000, or above 2000 and below 7500.

In some embodiments, as the compound represented by the general formula (3), it is preferable to use a thiol group-containing polysulfide wherein $R^1$ is $C_2H_4$, $R^2$ is $CH_2$, and $R^1$ is $C_2H_4$. In this embodiment, n in the general formula (3) can be, for instance, 3 to 70, 5 to 60, 7 to 50, or even 10 to 50.

(Epoxy Compound Having Two or More Epoxy Groups in One Molecule)

The epoxy compound to be reacted with the thiol group-containing polysulfide can be selected among various species of epoxy compound having two or more epoxy groups in one molecule. The epoxy compound can be a bifunctional epoxy compound having two epoxy groups in one molecule or a polyfunctional epoxy compound having three or more epoxy groups in one molecule. As the epoxy compound, solely one species or a combination of two or more species can be used. From the standpoint of the ease of handling at the reaction with the thiol group-containing polysulfide, etc., in some embodiments, it is preferable to use an epoxy compound that exists as liquid at room temperature.

Examples of the bifunctional epoxy compound include, but are not limited to, bisphenol A epoxy resins, bisphenol F epoxy resins, hydrogenated bisphenol A epoxy resins (i.e. epoxy compounds corresponding to that in structure resulting from hydrogenation of bisphenol A epoxy resins to convert aromatic rings to cycloalkyl rings), hydrogenated F epoxy resins, biphenyl epoxy resins, aliphatic epoxy resins (e.g. polypropylene glycol-based epoxy resins, etc.), 1,6-hexanediol diglycidyl ether, and polyethylene glycol diglycidyl ether.

Examples of the polyfunctional epoxy compound include, but are not limited to, novolac-based epoxy resins, glycidyl amine-based epoxy resins, biphenyl-based epoxy resins, triphenylmethane-based epoxy resins, dicyclopentadiene-based epoxy resins, glycerin-based epoxy resins, trimethylol propane-based epoxy resins, N,N,N',N'-tetraglycidyl-m-xylenediamine, 1,3-bis(N,N-diglycidylaminomethyl)cyclohexane, and polyglycerol polyglycidyl ether. The number of epoxy groups in one molecule of the polyfunctional epoxy compound is at least 3 or greater, can be 4 or greater, or even 5 or greater. The number of epoxy groups in one molecule of the polyfunctional epoxy compound is usually suitably 10 or less, possibly 8 or less, or even 6 or less.

In some embodiments, as the epoxy compound, a bifunctional epoxy compound can be preferably used. The use of the bifunctional epoxy compound can be advantageous in obtaining a sealant sheet that gives a cured material showing suitable stretchiness. As the bifunctional epoxy compound, solely one species or a combination of two or more species can be used.

In some embodiments, as the bifunctional epoxy compound, it is preferable to use an epoxy compound having a five-membered or larger carbon ring structure in the molecule. With a sealant sheet formed using a bifunctional epoxy compound having such a structure, the resulting cured material tends to show high strength and good stretchiness. The five-membered or larger carbon ring structure can be, for instance, a benzene ring, naphthalene ring, cyclohexyl ring, etc. Examples of the epoxy compound including such a carbon ring structure include bisphenol A epoxy resins, bisphenol F epoxy resins, hydrogenated bisphenol A epoxy resins, hydrogenated bisphenol F epoxy resins, and biphenyl epoxy resins. In a preferable embodiment, as the bifunctional epoxy compound, a bisphenol F epoxy resin can be used.

As the epoxy compound, one, two or more species of polyfunctional epoxy compound can be used in combination with a bifunctional epoxy compound or in place of the bifunctional epoxy resin. The use of a polyfunctional epoxy resin may increase the strength of the cured material. The combined use of a bifunctional epoxy compound and a polyfunctional epoxy compound can bring about a sealant sheet that provides a cured material that combines strength and stretchiness at a high level.

In some embodiments, as the polyfunctional epoxy compound, it is possible to use a polyfunctional epoxy compound having an epoxy group-containing repeat unit (i.e. a polyfunctional epoxy polymer) and it is preferable to use, for instance, a novolac-based epoxy resin. Examples of the novolac-based epoxy resin include phenol novolac-based epoxy resins and o-cresol novolac-based epoxy resins. The use of a novolac-based epoxy resin may be advantageous in obtaining a sealant sheet that gives a cured material with high strength and good stretchiness. With the use of a novolac-based epoxy resin having a lower molecular weight, the stretchiness of the cured material tends to increase. For instance, it is preferable to use a phenol novolac-based epoxy resin that exists as liquid at room temperature.

When carrying out the reaction between the thiol group-containing polysulfide and the epoxy compound having two or more epoxy groups in one molecule, any of a suitable catalyst can be used as long as the effect obtainable by the art disclosed herein is not greatly impaired. For instance, a known base catalyst can be suitably selected and used, such as 2,4,6-triaminomethylphenol, triethylamine, and 1,8-diazabicyclo[5.4.0]undeca-7-ene.

The reaction can proceed by mixing a thiol group-containing polysulfide and an epoxy compound having two or more epoxy groups in one molecule as well as a catalyst used as necessary in a suitable reaction vessel. In some preferable embodiments, a thiol group-containing polysulfide, a bifunctional epoxy compound, a polyfunctional epoxy compound and a catalyst (e.g. a base catalyst) are mixed in a suitable reaction vessel. There are no particular limitations to the method for supplying the respective materials to the reaction vessel or the order of mixing them, and they can be selected to form a suitable reaction product. The reaction conditions can be suitably selected as long as the effect obtainable by the art disclosed herein is not greatly impaired. In some embodiments, the reaction can be carried out at a reaction temperature of, for instance, 0° C. to 120° C., preferably 5° C. to 120° C., or more preferably 10° C. to 120° C. In view of the ease of controlling the reaction and the reaction efficiency, in some embodiments, the reaction temperature can be, for instance, 20° C. to 100° C., 30° C. to 100° C., 40° C. to 100° C., or even 60° C. to 100° C.

As for the usage ratio between the thiol group-containing polysulfide and the epoxy compound having two or more epoxy groups in one molecule, a suitable arbitrary usage ratio can be selected as long as the effect obtainable by the art disclosed herein is not greatly impaired.

The usage ratio can be selected, for instance, so that the ratio of the total number of epoxy groups in the epoxy compound to the total number of thiol groups in the thiol group-containing polysulfide, i.e., the equivalent ratio of epoxy groups/thiol groups (or the epoxy/thiol ratio, hereinafter), has a value of 1 or greater. For instance, it can be selected so that the ratio value is above 1. In some embodiments, the epoxy/thiol ratio value can be, for instance, above 1.1, or even above 1.2. From the standpoint of increasing the strength of the cured material, etc., in some embodiments, the epoxy/thiol ratio value can be, for instance, above 1.4, above 1.5, above 1.7, above 1.9, above 2, or even above 2.5. The epoxy/thiol ratio value can be, for instance, below 7.0, below 5.0, below 4.5, or even below 4.0. In some embodiments, from the standpoint of enhancing the stretchiness of the cured material, etc., the epoxy/thiol ratio value can be, for instance, below 3.5, below 3.2, below 3.0, below 2.5, below 2.0, or even below 1.8. The art disclosed herein can be favorably implemented in an embodiment where, for instance, the epoxy/thiol ratio value is above 1.2 and below 3.5, above 1.4 and below 3.2, or above 1.5 and below 2.5.

In some embodiments, the epoxy/thiol ratio value can be, for instance, 2.5 or less, or even 2.0 or less. With decreasing epoxy/thiol ratio value, the oil resistance tends to improve. From such a standpoint, in some embodiments, the epoxy/thiol ratio value can be 1.5 or less, 1.4 or less, 1.3 or less, or even 1.2 or less. From the standpoint of the curing ability of the sealant sheet, etc., the epoxy/thiol ratio value can be, for instance, 0.8 or greater, 0.9 or greater, 0.95 or greater, typically 1.0 or greater, or possibly even above 1.0.

It is noted that in the epoxy group-containing polysulfide formed using an epoxy compound having two or more epoxy groups in one molecule (e.g. an epoxy group-containing polysulfide as a reaction product of a thiol group-containing polysulfide and an epoxy compound having two or more epoxy groups in one molecule), some of the epoxy groups in the epoxy compound are used in the reaction to form the epoxy group-containing polysulfide and the rest are included as unreacted epoxy groups in the epoxy group-containing polysulfide. Accordingly, a sealant sheet including such an epoxy group-containing polysulfide can be thought as a semi-cured sealant sheet which can be further cured using the unreacted epoxy groups.

<Filler>

To the sealant sheet disclosed herein may contain a filler. This may improve either one or both between the breaking strength and the elongation at break of a cured material formed from the sealant sheet disclosed herein. The filler may be useful in adjusting the storage modulus of the sealant sheet. With the filler suitably used, the shape-holding properties and ease of processing of the sealant sheet may be improved. The filler used is not particularly limited. Any of a suitable filler can be used as long as the effect obtainable by the art disclosed herein is not greatly impaired. As the filler, solely one species or a combination of two or more species can be used.

Examples of the filler include, but are not limited to, talc, silica, carbon black, alumina, clay mica, aluminum hydroxide, magnesium hydroxide, calcium carbonate, magnesium carbonate, barium sulfate, titanium dioxide, barium titanate, strontium titanate, calcium titanate, magnesium titanate, bismuth titanate, boron nitride, aluminum borate, barium zirconate and calcium zirconate. Particularly preferable examples include talc, silica and calcium carbonate.

The amount of filler to be included is not particularly limited and can be selected to obtain favorable properties. The filler content can be, for instance, 1% by weight or more of the entire sealant sheet, or also 5% by weight or more. From the standpoint of obtaining greater effect of the use, it can be 10% by weight or more, or even 15% by weight or more. From the standpoint of increasing the strength of the cured material, etc., in some embodiments, the filler content can be, for instance, 15% by weight or more of the entire sealant sheet, 19% by weight or more, 22% by weight or more, 25% by weight or more, or even 30% by weight or more. An excessively high filler content may lead to a tendency of lower levels of ease of molding into a sheet form and stretchiness of the cured material. From such a standpoint, in some embodiments, the filler content can be, for instance, below 50% by weight of the entire sealant sheet, 40% by weight or lower, below 40% by weight, or even below 35% by weight. From the standpoint of placing more importance on the stretchiness of the cured material, in some embodiments, the filler content can be, for instance, below 30% by weight of the entire sealant sheet, or even below 25% by weight.

The mean particle diameter of the filler is not particularly limited. The mean particle diameter is usually suitably 100 μm or less, or preferably 50 μm or less. A smaller mean particle diameter tends to bring a greater effect in improving either or both between the breaking strength and the elongation at break of the cured material. For instance, the use of a filler having a smaller mean particle diameter can effectively increase the breaking strength of the cured material. In some embodiments, the filler may have a mean particle diameter of, for instance, 30 μm or less, 20 μm or less, 15 μm or less, 10 μm or less, 5 μm or less, or even 3.5 μm or less. The filler's mean particle diameter can be, for instance, 0.1 μm or greater, 0.2 μm or greater, or even 0.5 μm or greater. From the standpoint of the handling properties and dispersibility of the filler, it may be advantageous that the mean particle diameter is not excessively small.

As used herein, the mean particle diameter of the filler refers to the 50th percentile particle diameter by volume (50% median diameter) in a size distribution obtained by laser scattering/diffraction method analysis.

<Curing Agent>

The sealant sheet disclosed herein may include a curing agent for the sealant sheet. As the curing agent, a material having a functional group reactive to epoxy group can be used. For instance, one, two or more species can be selected and used among imidazole-based curing agents (e.g. 2-methylimidazole, 1-isobutyl-2-methylimidazole, 2-ethyl-4-methylimidazole, 1-cyanoethyl-2-undecylimidazolium trimellitate, etc.), amine-based curing agents (e.g. aliphatic amine-based curing agents, aromatic amine-based curing agents), acid anhydride-based curing agents, dicyandiamide-based curing agents, and polyamide-based curing agents. Curing agents preferable from the standpoint of the reactivity at room temperature include imidazole-based curing agents and amine-based curing agents. Imidazole-based curing agents are particularly preferable. According to an imidazole-based curing agent, the resulting cured material tends to show high strength and good stretchiness. One reason for this can be thought as follows: the reaction between the imidazole compound and epoxy group is chain polymerization that starts from the imidazole compound with a little increase in crosslinking points; and therefore, while suppressing the decrease in stretchiness caused by an excessively high crosslinking degree, the strength of the cured material can be increased.

The sealant sheet disclosed herein may include other optional components as long as the effect obtainable by the art disclosed herein is not greatly impaired. Examples of such optional components include, but are not limited to, colorants such as dyes and pigments, dispersing agent, plasticizer, softener, flame retardant, anti-aging agent, UV absorber, antioxidant, and photo-stabilizer.

The sealant sheet disclosed herein may include other polymer or oligomer (or optional polymer, hereinafter) besides the epoxy group-containing polysulfide, for instance, to increase the tightness of adhesion to the target area to be sealed, etc. From the standpoint of the oil resistance of the cured material, the optional polymer content is preferably 10 parts by weight or less, more preferably 5 parts by weight or less, or yet more preferably 1 part by weight or less, relative to 100 parts by weight of the epoxy group-containing polysulfide. The sealant sheet may be essentially free of such an optional polymer. In this description, being essentially free of a certain component means that the component is not included at least intentionally, unless otherwise noted.

In the sealant sheet disclosed herein, the organic solvent content thereof can be, for instance, 5% by weight or less, 2% by weight or less, 1% by weight or less, or even 0.5% by weight or less; or it can be essentially free of an organic solvent. The organic solvent content can be 0%. The organic solvent refers to a component that is not supposed to react with other components (especially the epoxy group-containing polysulfide or a curing agent possibly used as necessary) in the sealant sheet, such as toluene, cyclohexanone and trichloroethane.

The sealant sheet disclosed herein may include a free epoxy compound that has two or more epoxy groups in one molecule and is not chemically bonded to an epoxy group-containing polysulfide. Such a free epoxy compound generally has a low molecular weight as compared to an epoxy group-containing polysulfide; and therefore, it may serve to increase the tackiness of the sealant sheet disclosed herein. When the tackiness of the sealant sheet is increased, for instance, the sealant sheet placed in a target area to be sealed may show greater temporary fixing properties to the target area. The temporary fixing properties refer to properties that inhibit the sealant sheet from lifting off or shifting in position from the target area to be sealed until the sealant sheet placed in the target area cures. When the sealant sheet is allowed to cure, the free epoxy compound cures along with the epoxy group-containing polysulfide to form a cured sealant. The free epoxy compound can be, for instance, a bifunctional epoxy compound or polyfunctional epoxy compound that can be used in synthesis of the epoxy group-containing polysulfide.

The free epoxy compound content by weight can be, for instance, below 1%, below 0.5% by weight, or even below 0.1% by weight of the entire sealant sheet. Alternatively, the sealant sheet may be essentially free of a free epoxy compound. Even in an embodiment essentially free of the free epoxy compound, the sealant sheet disclosed herein may have tackiness on the surface and can be temporarily fixed to a target area to be sealed.

<Release Liner>

A release liner can be used during preparation (e.g. sheet formation) of the sealant sheet disclosed herein, storage distribution, shaping, placement in a target area to be sealed, etc. of the sealant sheet prior to use. The release liner is not particularly limited. For instance, it is possible to use a release liner having a release face on the surface of a liner substrate such as resin film, paper and the like; or a release liner formed from a low-adhesive material such as fluoropolymer (tetrafluoroethylene, etc.) and polyolefinic resin (polyethylene, polypropylene, etc.). The release face may be formed, for instance, subjecting the liner substrate to a surface treatment with a release agent such as silicone-based, long-chain alkyl based, fluorine-based release agents and molybdenum sulfide.

<Method for Producing Sealant Sheet>

Some embodiments of the sealant sheet production method disclosed herein are described with reference to an example of the sealant sheet comprising an epoxy group-containing polysulfide and a filler. It is noted that the following description is for illustration purposes and does not limit the method for producing the sealant sheet disclosed herein. The following description does not limit the sealant sheet disclosed herein to an embodiment including a filler.

The sealant sheet disclosed herein can be produced by a method that comprises obtaining a mixture including an epoxy group-containing polysulfide and a filler, and molding the mixture into a sheet. When the epoxy group-containing polysulfide is a reaction product of a thiol group-containing polysulfide, a bifunctional epoxy compound and a polyfunctional epoxy compound, the step of obtaining the mixture may include, in the following order, preparing the reaction product of the thiol group-containing polysulfide, the bifunctional epoxy compound and the polyfunctional epoxy compound; and mixing the reaction product and the filler. Alternatively, the filler can be mixed together when preparing the reaction product.

With respect to the preparation of the reaction product, the description regarding the reaction between the thiol group-containing polysulfide and the epoxy compound having two or more epoxy group in one molecule may apply Thus, a redundant description is omitted. When producing a sealant sheet that includes a curing agent, it is preferable to employ a method where after the reaction product is prepared, the filler and curing agent are added to and mixed with the reaction product simultaneously or in an arbitrary order. Examples of a system that can be used for mixing the reaction product and the filler include, but are not limited to, sealed mixing machines or batch mixing machines such as Banbury mixer, kneader, two-roller mill and three-roller mill; and continuous mixing machines such as single screw extruder and two screw extruder.

As the method for molding the mixture into a sheet, a single method or a combination of methods can be employed among known sheet forming methods such as press-molding, calender molding and hot-melt extrusion. The press-molding can be normal pressing or vacuum pressing. From the standpoint of preventing the sheet from trapping air bubbles and inhibiting thermal denaturation of the mixture, in some embodiments, vacuum pressing or calender molding can be preferably applied. The resulting sealant sheet can be subjected to, for instance in a form of the release-lined sealant sheet as shown in FIG. 1 or FIG. 2, storage, processing (e.g. slit processing into a prescribed width, processing a roll into flat sheets, punching out prescribed shapes, etc.), transportation, etc.

<Applications (Usages)>

There are no particular limitations to the material of the area to be sealed with the sealant sheet disclosed herein. The material can be, for instance, a metal, a resin, a composite material of these, etc. More specific examples include metal and metalloid materials such as iron, iron alloys (carbon steel, stainless steel, chromium steel, nickel steel, etc.), aluminum, aluminum alloys, nickel, tungsten, copper, copper alloys, titanium, titanium alloys and silicon; resin materials such as polyolefin resins, polycarbonate resins, acrylic resins, and acrylonitrile resins (PAN); ceramic materials such as alumina, silica, sapphire, silicon nitride, tantalum nitride, titanium carbide, silicon carbide, gallium nitride, and plaster; glass materials such as aluminosilicate glass, soda lime glass, soda aluminosilicate glass, and quartz glass; and laminates and composites of these. Favorable examples of the metal and metalloid materials include light metals such as aluminum and titanium as well as alloys comprising the light metals as primary components. Examples of an aluminum alloy include duralumin (e.g. duralumin A2024, duralumin A2017, etc.). Examples of the composites include carbon fiber reinforced plastic (CFRP) and glass fiber reinforced plastic (FRP).

The sealant sheet exists as a non-liquid (i.e. solid) sheet in a temperature range around 25° C.; and therefore, unlike a liquid sealant, it is unnecessary for a worker to control the thickness when placing it in a target area to be sealed. In addition, unlike a liquid sealant, the sealant sheet can be pre-cut to fit a desired external form and placed in the target area to be sealed (typically adhered with the tackiness of the sealant sheet). Alternatively, the sealant sheet in a roll form can be applied to the target area while unwinding the roll and the remaining sealant sheet can be cut off. The use of the sealant sheet disclosed herein can fundamentally solve problems arising during liquid sealant application such as dripping, uneven application and excess spreading, significantly reducing the working time.

The sealant sheet placed in the target area to be sealed is allowed to cure to form a cured sealant. As for the sealant sheet with a pre-added curing agent, curing can proceed by utilizing the curing agent in the sealant sheet, without using another curing agent at the time of application. The curing conditions can be suitably selected in accordance with the curing agent in the sealant sheet. For instance, the sealant sheet including such as an imidazole-based curing agent or amine-based curing agent can be allowed to cure at room temperature. The curing reaction can be accelerated by means of heating, etc. While no particular limitations are imposed, one example of curing-accelerating conditions is that storing at a temperature between about 40° C. or higher and 80° C. or lower for about 6 hours to 14 days.

With respect to the sealant sheet in an embodiment with little to no curing agent content, it can be cured by for instance, employing techniques, such as: applying a curing agent to the target area to be sealed to form a primer layer and placing the sealant sheet over the primer layer; placing the sealant sheet in the target area to be sealed and then supplying a curing agent to its backside by coating, etc.; and the like. According to an embodiment where a curing agent is thus supplied to the sealant sheet at the time of application, the sealant sheet itself can be a composition with little to no curing agent content. This can increase the preservability of the sealant sheet. As the curing agent added at the time of application, a curing agent that exists as liquid at room temperature (e.g. about 25° C.) can be preferably used. Even in such an embodiment of application where a curing agent is used at the time of application, the application can be facilitated as compared to a conventional liquid sealant at least because the sealant sheet comprising a polysulfide is in the sheet form.

The matters disclosed in this description include the following:

(1) A sealant sheet formed as a sheet, comprising an epoxy group-containing polysulfide having a disulfide structure and an epoxy group in its molecule.

(2) The sealant sheet according to (1) above, having a storage modulus of 0.005 MPa or greater and 0.8 MPa or less at 25° C.

(3) The sealant sheet according to (2) above, having a thickness of 0.01 mm or greater and 10 mm or less.

(4) The sealant sheet according to any of (1) to (3) above, wherein the epoxy group-containing polysulfide is a reaction product of an epoxy compound having two or more epoxy groups in one molecule and a thiol group-containing polysulfide having a disulfide structure and a thiol group in one molecule.

(5) The sealant sheet according to (4) above, wherein the thiol group-containing polysulfide is a thiol-terminated polysulfide having a thiol group at each terminus.

(6) The sealant sheet according to (4) or (5) above, wherein the thiol group-containing polysulfide has a weight average molecular weight of 500 to 10000.

(7) The sealant sheet according to any of (4) to (6) above, wherein the epoxy compound comprises a bifunctional epoxy compound.

(8) The sealant sheet according to (7) above, comprising, as the bifunctional epoxy compound, an epoxy compound having a five-membered or larger carbon ring structure in its molecule.

(9) The sealant sheet according to (7) above, wherein the bifunctional epoxy compound comprises at least one species selected from the group consisting of bisphenol A epoxy resins, bisphenol F epoxy resins, hydrogenated bisphenol A epoxy resins, hydrogenated bisphenol F epoxy resins and biphenyl epoxy resins.

(10) The sealant sheet according to (4) to (9) above, wherein the epoxy compound comprises a trifunctional or higher polyfunctional epoxy compound.

(11) The sealant sheet according to (10) above, comprising a novolac epoxy resin as the polyfunctional epoxy compound.

(12) The sealant sheet according to any of (4) to (11) above, wherein the ratio (epoxy/thiol ratio) of the total number of epoxy groups in the epoxy compound to the total number of thiol groups in the thiol group-containing polysulfide is above 1.2 and below 7.0.
(13) The sealant sheet according to any of (4) to (11) above, wherein the ratio (epoxy/thiol ratio) of the total number of epoxy groups in the epoxy compound to the total number of thiol groups in the thiol group-containing polysulfide is 1.0 or higher and 2.0 or lower.
(14) The sealant sheet according to any of (1) to (13) above, further comprising a filler.
(15) The sealant sheet according to (14) above, wherein the filler content is 1% by weight or more and less than 40% by weight of the entire sealant sheet.
(16) The sealant sheet according to (14) above, wherein the filler content is 15% by weight or more and 40% by weight or less of the entire sealant sheet.
(17) The sealant sheet according to any of (14) to (17) above, wherein the filler has a mean particle diameter of 0.1 µm or greater and 30 µm or less.
(18) The sealant sheet according to any of (1) to (17) above, further comprising a curing agent.
(19) The sealant sheet according to (18) above, wherein the curing agent comprises at least one species selected from the group consisting of an imidazole-based curing agent, amine-based curing agent, acid anhydride-based curing agent, dicyanamide-based curing agent, polyamide-based curing agent, etc.
(20) A release-lined sealant sheet comprising the sealant sheet according to any of (1) to (19) above and a release liner having a release face in contact with at least one face of the sealant sheet.
(21) A method for producing a sealant sheet, the method comprising
obtaining a molding material that comprises an epoxy group-containing polysulfide, and
molding the molding material into a sheet.
(22) The method according to (21) above, wherein the obtaining the molding material includes allowing a thiol group-containing polysulfide having a disulfide structure and a thiol group in one molecule to react with an epoxy compound having two or more epoxy groups in one molecule to prepare the epoxy group-containing polysulfide.
(23) A method for applying a sealing, the method comprising
obtaining the sealant sheet according to any of (1) to (19) above,
adhering the sealant sheet to an area to be sealed, and
allowing the sealant sheet to cure on the area to form a cured sealant.

EXAMPLES

Several working examples related to the present invention are described below, but the present invention is not limited to these examples. In the description below, "parts" (or "pts" in the tables) are by weight unless otherwise specified.
The meaning of the abbreviations used in the working examples below are as follows:
LP-55: thiol-terminated polysulfide, THIOKOL LP-55, available from Toray Fine Chemicals Co., Ltd., Mw 4000
LP-31: thiol-terminated polysulfide, THIOKOL LP-31, available from Toray Fine Chemicals Co., Ltd., Mw 7500
LP-3: thiol-terminated polysulfide, THIOKOL LP-3, available from Toray Fine Chemicals Co., Ltd., Mw 1000 jER828: product name of bisphenol A epoxy resin available from Mitsubishi Chemical Corporation
jER806: product name of bisphenol F epoxy resin available from Mitsubishi Chemical Corporation
YX-8000: product name of hydrogenated bisphenol A epoxy resin available from Mitsubishi Chemical Corporation
Tetrad C: product name of 1,3-bis(N,N-diglycidylaminomethyl)cyclohexane available from Mitsubishi Gas Chemical Company, Inc.
jER152: product name of phenol novolac epoxy resin available from Mitsubishi Chemical Corporation
jER154: product name of phenol novolac epoxy resin available from Mitsubishi Chemical Corporation
KI-3000-4P: product name of o-cresol novolac (OCN) epoxy resin available from TOHTO Chemical Industry Co., Ltd.
N-770: product name of phenol novolac epoxy resin available from DIC Corporation
NC-3000: product name of biphenyl epoxy resin available from Nippon Kayaku Co., Ltd.
EPPN-501HY: product name of triphenylmethane epoxy resin available from Nippon Kayaku Co., Ltd.
IBMI12: product name of imidazole-based curing agent, 1-isobutyl-2-methylimidazole, available from Mitsubishi Chemical Corporation.
ST12: amine-based curing agent available from Mitsubishi Chemical Corporation, jER CURE ST12
Talc 23 µm: talc powder available from Maruo Calcium Co., Ltd., mean particle diameter 23 µm
Talc 21 µm: talc powder available from Nippon Talc Co., Ltd., TALC MS-KY, mean particle diameter 21 µm
Talc 15 µm: talc powder available from Nippon Talc Co., Ltd., TALC MS-P, mean particle diameter 15 µm
Talc 8 µm: talc powder available from Nippon Talc Co., Ltd., MICRO ACE K-1, mean particle diameter 8 µm
Talc 4.5 µm: talc powder available from Nippon Talc Co., Ltd., MICRO ACE P-4, mean particle diameter 4.5 µm
Talc 2.5 µm: talc powder available from Nippon Talc Co., Ltd., MICRO ACE SG-95, mean particle diameter 2.5 µm
Silica 4 µm: silica powder available from Sibelco Benelux, SIBELITE M6000, mean particle diameter 4 µm Experiment 1

Example A1

Using a reaction vessel equipped with a stirrer, 81.2 parts of liquid polysulfide, 18.8 parts of bifunctional epoxy compound and 2 parts of polyfunctional epoxy compound shown in Table 1 as well as 0.08 part of 2,4,6-triaminomethylphenol (TAP, available from Tokyo Chemical Industry) as a base catalysts were heated at 90° C. for 3 hours while stirring. By this, an epoxy group-containing polysulfide having disulfides and epoxy groups in the molecule was synthesized. The reaction mixture was collected from the reaction vessel and allowed to cool to room temperature. To this, were added 30 parts of talc (mean particle diameter 23 µm) as a filler and 5 parts of a curing agent. Using a two-roller mill, the resultant was uniformly kneaded. As the curing agent, was used an imidazole-based curing agent, IBMI12. The resulting mixture was molded into sheets using a vacuum pressing machine to obtain a sealant sheet according to this Example. Here, two kinds of sheets were prepared, namely, a 0.5 mm thick sheet for measurement of breaking strength and elongation at break and a 1 mm thick sheet for measurement of storage modulus.

Examples A2 to A3

The liquid polysulfide, bifunctional epoxy compound and polyfunctional epoxy compound were used in the amounts shown in Table 1. Otherwise in the same manner as Example A1, were prepared sealant sheet according to Examples A2 and A3.

(Determination of Storage Modulus)

From the 1 mm thick sealant sheets, were punched out discs of 8 mm in diameter. Each disc was placed between parallel plates. Using a rheometer (model name ARES G2 available from TA Instruments Japan, Inc.), was determined the storage modulus G' at a measurement temperature of 25° C., at a frequency of 1 Hz, at 0.5% strain. As a result, the sealant sheets according to Examples A1 to A3 all had storage moduli G' falling within the range of 0.005 MPa to 0.8 MPa.

(Determination of Breaking Strength and Elongation at Break)

The 0.5 mm thick sealant sheets were heated at 60° C. for four days to cure. The resulting cured materials (cured sealants) were cut into 10 mm wide, 50 mm long rectangles to prepare sample pieces. Each sample piece was clamped in the chuck of a tensile tester at a chuck distance of 20 mm. Based on JIS K6767, the sample piece was stretched at a rate of 50 mm/min and the maximum strength observed before the sample piece broke was recorded as the breaking strength. From the chuck distance at break (L) at which the sample broke and the initial chuck distance (L0) at the start of stretching, the elongation at break was determined by the next equation: Elongation at break (%)=((L1−L0)/L0)×100. The results are shown in Table 1.

(Oil Resistance Test)

The 0.5 mm sealant sheets were cut into 25 mm wide, 100 mm long rectangles to prepare sealant sheet pieces for oil resistance tests. Each sealant sheet piece was placed at around the center of a rectangular stainless steel plate (SUS304BA plate) measuring about 50 mm in width and about 150 mm in length and was press-bonded with a hand-held roller moved back and forth once. Sealant sheet pieces thus press-bonded to stainless steel plates were heated at 60° C. for four days to cure. Subsequently, along with the stainless steel plates, they were immersed in hydraulic oil (product name SKYDROL, phosphate ester-based hydraulic oil available from Solutia) or in jet fuel (product name JET A-1 available from EMG Marketing G. K) and left at room temperature for two weeks. As a result, with respect to any of the cured materials formed from the sealant sheets of Examples A1 to A3, no notable penetration of the hydraulic oil or jet fuel was observed at the interfaces between the cured materials and the stainless steel plates. No swelling was observed with the cured materials, either.

TABLE 1

| | | Example | | |
|---|---|---|---|---|
| | | A1 | A2 | A3 |
| Liquid polysulfide (pts) | LP-55 | 81.2 | 86 | 89.2 |
| Bifunctional epoxy compound (pts) | jER828 | 18.8 | 14 | 10.8 |
| Polyfunctional epoxy compound (pts) | Tetrad C | 2 | 5 | 7 |
| Epoxy/thiol ratio | | 3.0 | 3.0 | 3.0 |
| Evaluation of cured material | Breaking strength (MPa) | 1 | 0.95 | 0.82 |
| | Elongation at break (%) | 92 | 49 | 45 |

The sealant sheets according to this Experiment all had flexible sheet forms with surface tackiness and stably retained their sheet forms. By the operation as easy as applying these sealant sheets, SUS304BA plates were adequately covered each with a 0.5 mm thick sealant layer. The cured materials formed from the sealant sheets of this Experiment showed good oil resistance. They also exhibited breaking strength and elongation at break suited for sealing. This Experiment shows that a polyfunctional epoxy compound can be used for adjustment of breaking strength and elongation at break.

Experiment 2

The species of liquid polysulfide, bifunctional epoxy compound and polyfunctional epoxy compound and their amounts used were as shown in Table 2. Otherwise in the same manner as Example A1, were prepared sealant sheets according to Examples B1 to B3. The resulting sealant sheets all had storage moduli G' in the range falling within the range of 0.005 MPa to 0.8 MPa.

Each sealant sheet was allowed to cure in the same manner as in Experiment 1 and the breaking strength and elongation at break of the cured material were determined. The results are shown in Table 2. Table 2 also shows the results of the sealant sheet of Example A2 obtained in Experiment 1.

TABLE 2

| | | Example | | | |
|---|---|---|---|---|---|
| | | A2 | B1 | B2 | B3 |
| Liquid polysulfide (pts) | LP-55 | 86 | 45.3 | | 32.5 |
| | LP-31 | | 45.3 | 96 | |
| | LP-3 | | | | 32.5 |
| Bifunctional epoxy compound (pts) | jER828 | 14 | 9.4 | 4 | 35 |
| Polyfunctional epoxy compound (pts) | Tetrad C | 5 | 5 | 5 | 5 |
| Epoxy/thiol ratio | | 3.0 | 3.0 | 3.0 | 3.0 |
| Evaluation of cured material | Breaking strength (MPa) | 0.95 | 0.94 | 0.95 | 0.67 |
| | Elongation at break (%) | 49 | 47 | 43 | 59 |

Like the sealant sheets according to Experiment 1, the sealant sheets according to this Experiment all showed good shape retention (shape-holding properties) and handling properties as well. According to the sealant sheets of Examples B1, B2 and A2 using liquid polysulfides with higher Mw, the resulting cured materials had a tendency to show greater breaking strength.

Experiment 3

The species of liquid polysulfide, bifunctional epoxy compound and polyfunctional epoxy compound and their amounts used were as shown in Table 3. Otherwise in the same manner as Example A1, were prepared sealant sheets according to Examples C1 and C2. The resulting sealant sheets both had storage moduli G' in the range falling within the range of 0.005 MPa to 0.8 MPa.

Each sealant sheet was allowed to cure in the same manner as in Experiment 1 and the breaking strength and elongation at break of the cured material were determined. The results are shown in Table 3. Table 3 also shows the results of the sealant sheet of Example A2 obtained in Experiment 1.

TABLE 3

|  |  | Example | | |
|---|---|---|---|---|
|  |  | C1 | C2 | A1 |
| Liquid polysulfide (pts) | LP-55 | 94 | 87.5 | 81.2 |
| Bifunctional epoxy compound (pts) | jER828 | 6 | 12.5 | 18.8 |
| Polyfunctional epoxy compound (pts) | Tetrad C | 2 | 2 | 2 |
| Epoxy/thiol ratio | | 1.1 | 2.0 | 3.0 |
| Evaluation of cured material | Breaking strength (MPa) | 0.92 | 1.04 | 1 |
|  | Elongation at break (%) | 60 | 125 | 92 |

Like the sealant sheets according to Experiment 1, the sealant sheets according to this Experiment both showed good shape-holding properties and handling properties as well. When the epoxy/thiol ratio becomes significantly close to 1 as with Example C1, the cured material tended to show some decrease in elongation at break.

Experiment 4

The species of liquid polysulfide, bifunctional epoxy compound and polyfunctional epoxy compound and their amounts used were as shown in Table 4. Otherwise in the same manner as Example A1, were prepared sealant sheets according to Examples D1 and D2. The resulting sealant sheets both had storage moduli G' in the range falling within the range of 0.005 MPa to 0.8 MPa.

Each sealant sheet was allowed to cure in the same manner as in Experiment 1 and the breaking strength and elongation at break of the cured material were determined. The results are shown in Table 4. Table 4 also shows the results of the sealant sheet of Example C2 obtained in Experiment 3.

TABLE 4

|  |  | Example | | |
|---|---|---|---|---|
|  |  | C2 | D1 | D2 |
| Liquid polysulfide (pts) | LP-55 | 87.5 | 89 | 86.8 |
| Bifunctional epoxy compound (pts) | jER828 | 12.5 |  |  |
|  | jER806 |  | 11 |  |
|  | YX-8000 |  |  | 13.2 |
| Polyfunctional epoxy compound (pts) | Tetrad C | 2 | 2 | 2 |
| Epoxy/thiol ratio | | 2.0 | 2.0 | 2.0 |
| Evaluation of cured material | Breaking strength (MPa) | 1.04 | 1.18 | 0.96 |
|  | Elongation at break (%) | 125 | 160 | 130 |

Like the sealant sheets according to Experiment 1, the sealant sheets according to this Experiment both showed good shape-holding properties and handling properties as well. In Example D1 using bisphenol F epoxy resin, the resulting cured material showed greater breaking strength and elongation at break than those of Examples C2 and D2.

Experiment 5

The species of curing agent and its amount used were as shown in Table 5. Otherwise in the same manner as Example C2, was prepared a sealant sheet according to Example E1. The resulting sealant sheet had a storage modulus G' falling within the range of 0.005 MPa to 0.8 MPa. The sealant sheet was allowed to cure in the same manner as in Experiment 1 and the breaking strength and elongation at break of the cured material were determined. The results are shown in Table 5. Table 5 also shows the results of the sealant sheet of Example C2 obtained in Experiment 3.

TABLE 5

|  |  | Example | |
|---|---|---|---|
|  |  | C2 | E1 |
| Liquid polysulfide (pts) | LP-55 | 87.5 | 87.5 |
| Bifunctional epoxy compound (pts) | jER828 | 12.5 | 12.5 |
| Polyfunctional epoxy compound (pts) | Tetrad C | 2 | 2 |
| Epoxy/thiol ratio |  | 2.0 | 2.0 |
| Curing agent | IBMI12 | 5 |  |
|  | ST12 |  | 2.3 |
| Evaluation of cured material | Breaking strength (MPa) | 1.04 | 0.96 |
|  | Elongation at break (%) | 125 | 72 |

Like the sealant sheets according to Experiment 1, the sealant sheet according to this Experiment also showed good shape-holding properties and handling properties. In Example C2 using the imidazole-based curing agent, the resulting cured material showed greater breaking strength and elongation at break than that of Example E1 using the amino-based curing agent.

Experiment 6

The species of liquid polysulfide, bifunctional epoxy compound and polyfunctional epoxy compound and their amounts used were as shown in Table 6. Otherwise in the same manner as Example A1, were prepared sealant sheets according to Examples F1 to F6. It is noted that among the polyfunctional epoxy compounds used in this Experiment, jER152 has a lower molecular weight than jER154. The resulting sealant sheets all had storage moduli G' falling within the range of 0.005 MPa to 0.8 MPa.

Each sealant sheet was allowed to cure in the same manner as in Experiment 1 and the breaking strength and elongation at break of the cured material were determined. The results are shown in Table 6. Table 6 also shows the results of the sealant sheet of Example D1 obtained in Experiment 4.

TABLE 6

|  |  | Example | | | | | | |
|---|---|---|---|---|---|---|---|---|
|  |  | F1 | F2 | F3 | F4 | F5 | F6 | D1 |
| Liquid polysulfide (pts) | LP-55 | 87.5 | 87.5 | 87.5 | 87.5 | 87.5 | 87.5 | 89 |
| Bifunctional epoxy compound (pts) | jER806 | 12.5 | 12.5 | 12.5 | 12.5 | 12.5 | 12.5 | 11 |

TABLE 6-continued

| | | Example | | | | | | |
|---|---|---|---|---|---|---|---|---|
| | | F1 | F2 | F3 | F4 | F5 | F6 | D1 |
| Polyfunctional epoxy compound (pts) | jER152 | 2 | | | | | | |
| | jER154 | | 2 | | | | | |
| | KI-3000-4P | | | 2 | | | | |
| | N-770 | | | | 2 | | | |
| | NC-3000 | | | | | 2 | | |
| | EPPN-501HY | | | | | | 2 | |
| | Tetrad C | | | | | | | 2 |
| Epoxy/thiol ratio | | 2.0 | 2.0 | 2.0 | 2.0 | 2.0 | 2.0 | 2.0 |
| Evaluation of cured material | Breaking strength (MPa) | 0.95 | 1.13 | 0.98 | 0.95 | 0.91 | 0.99 | 1.18 |
| | Elongation at break (%) | 455 | 270 | 204 | 210 | 390 | 180 | 160 |

Like the sealant sheets according to Experiment 1, the sealant sheets according to this Experiment all showed good shape-holding properties and handling properties as well. According to Examples F1 to F6 using polyfunctional epoxy polymers, the resulting cured materials showed greater elongation at break as compared to that of Example D1. With increasing molecular weight of the polyfunctional epoxy polymer, there was a tendency that the breaking strength increased while the elongation at break decreased.

Experiment 7

The species of liquid polysulfide, bifunctional epoxy compound, polyfunctional epoxy compound and filler and their amounts used were as shown in Table 7. Otherwise in the same manner as Example A1, were prepared sealant sheets according to Examples G1 to G3. The resulting sealant sheets all had storage moduli G' falling within the range of 0.005 MPa to 0.8 MPa.

Each sealant sheet was allowed to cure in the same manner as in Experiment 1 and the breaking strength and elongation at break of the cured material were determined. The results are shown in Table 7. Table 7 also shows the results of the sealant sheet of Example F1 obtained in Experiment 6.

TABLE 7

| | | Example | | | |
|---|---|---|---|---|---|
| | | F1 | G1 | G2 | G3 |
| Liquid polysulfide (pts) | LP-55 | 87.5 | 87.5 | 87.5 | 90 |
| Bifunctional epoxy compound (pts) | jER806 | 12.5 | 12.5 | 12.5 | 10 |
| Polyfunctional epoxy compound (pts) | jER152 | 2 | 2 | 2 | 2 |
| Epoxy/thiol ratio | | 2.0 | 2.0 | 2.0 | 1.6 |
| Filler (pts) | Talc 23 μm | 30 | | | 30 |
| | Talc 2.5 μm | | 30 | | |
| | Silica 4 μm | | | 30 | |
| Evaluation of cured material | Breaking strength (MPa) | 0.95 | 1.38 | 0.82 | 1.25 |
| | Elongation at break (%) | 455 | 350 | 620 | 457 |

Like the sealant sheets according to Experiment 1, the sealant sheets according to this Experiment all showed good shape-holding properties and handling properties as well. According to Example G1 using the talc with a smaller particle diameter as the filler, the cured material showed a significant increase in breaking strength as compared to that of Example F1. According to Example G2 using silica as the filler, the resulting cured material showed excellent elongation at break. As for G3 having an epoxy/thiol ratio below 2.0, the resulting cured material showed an increase in elongation at break as compared to G2, showing excellent breaking strength and elongation at break as well.

Experiment 8

The species of liquid polysulfide, bifunctional epoxy compound, polyfunctional epoxy compound and filler and their amounts used were as shown in Table 8. In addition to 0.5 mm thick sheets and 1 mm thick sheets, 0.2 mm sheets were also prepared for determination of swelling ratio. Otherwise in the same manner as Example A1, were prepared sealant sheets according to Examples H1 to H3. The resulting sealant sheets all had storage moduli G' falling within the range of 0.005 MPa to 0.8 MPa.

Each sealant sheet was allowed to cure in the same manner as in Experiment 1 and the breaking strength and elongation at break of the cured material were determined. The swelling ratio was also determined by the method described below. A lower swelling ratio indicates higher oil resistance.

(Determination of Swelling Ratio)

Each 0.2 mm thick sealant sheet was heated at 60° C. for four days to cure and cut into a rectangle measuring 10 mm in short side and 50 mm in long side to prepare a sealant sheet piece for swelling ratio measurement. The sealant sheet piece was immersed in hydraulic oil (product name Hyjet V phosphate ester-based fire-resistant aircraft hydraulic oil available from Exxon Mobil Corporation) and left at 25° C. for 336 hours. Subsequently, the sealant sheet piece was collected from the hydraulic oil and the hydraulic oil left on the surface was wiped off. Subsequently, the length of the long side of the sealant sheet piece was measured. From the long side length S1 after the hydraulic oil immersion and the initial long side length S0 prior to the hydraulic oil immersion, the swelling ratio was determined by the next equation:

Swelling ratio (%)=((S1−S0)/S0)×100

The results are shown in Table 8. Table 8 also shows the test results of the sealant sheet of Example G1 obtained in Experiment 7.

TABLE 8

| | | Example | | | |
|---|---|---|---|---|---|
| | | H1 | H2 | H3 | G1 |
| Liquid polysulfide (pts) | LP-55 | 90 | 90 | 90 | 87.5 |
| Bifunctional epoxy compound (pts) | jER806 | 6.3 | 6.3 | 6.3 | 12.5 |
| Polyfunctional epoxy compound (pts) | jER152 | 2 | 2 | 2 | 2 |
| Epoxy/thiol ratio | | 1.1 | 1.4 | 1.7 | 2.0 |
| Filler (pts) | Talc 2.5 μm | 30 | 30 | 30 | 30 |
| Evaluation of cured material | Breaking strength (MPa) | 1.66 | 1.63 | 1.58 | 1.38 |
| | Elongation at break (%) | 310 | 280 | 290 | 350 |
| | Swelling ratio | 30% | 38% | 44% | 48% |

The sealant sheets according to this Experiment all showed good shape-holding properties and handling properties as well. As indicated by the smaller swelling ratios, with decreasing epoxy/thiol ratio, the oil resistance to hydraulic oil showed a tendency to increase.

Experiment 9

The species of liquid polysulfide, bifunctional epoxy compound, polyfunctional epoxy compound and filler and their amounts used were as shown in Table 9. Otherwise in the same manner as Example A1, were prepared sealant sheets according to Examples J1 to J5. The resulting sealant sheets all had storage moduli G' falling within the range of 0.005 MPa to 0.8 MPa.

Each sealant sheet was allowed to cure in the same manner as in Experiment 1 and the breaking strength and elongation at break of the cured material were determined. The results are shown in Table 9. Table 9 also shows the results of the sealant sheet of Example H1 obtained in Experiment 8.

TABLE 9

| | | Example | | | | | |
|---|---|---|---|---|---|---|---|
| | | J1 | J2 | J3 | J4 | J5 | H1 |
| Liquid polysulfide (pts) | LP-55 | 90 | 90 | 90 | 90 | 90 | 90 |
| Bifunctional epoxy compound (pts) | jER806 | 6.3 | 6.3 | 6.3 | 6.3 | 6.3 | 6.3 |
| Polyfunctional epoxy compound (pts) | jER152 | 2 | 2 | 2 | 2 | 2 | 2 |
| Epoxy/thiol ratio | | 1.1 | 1.1 | 1.1 | 1.1 | 1.1 | 1.1 |
| Filler (pts) | Talc 23 μm | 30 | | | | | |
| | Talc 21 μm | | 30 | | | | |
| | Talc 15 μm | | | 30 | | | |
| | Talc 8 μm | | | | 30 | | |
| | Talc 4.5 μm | | | | | 30 | |
| | Talc 2.5 μm | | | | | | 30 |
| Evaluation of cured material | Breaking strength (MPa) | 1.10 | 1.15 | 1.22 | 1.40 | 1.55 | 1.66 |
| | Elongation at break (%) | 310 | 280 | 280 | 260 | 250 | 310 |

The sealant sheets according to this Experiment all showed good shape-holding properties and handling properties as well. With decreasing particle diameter of the filler used, the breaking strength showed a tendency to increase.

Experiment 10

The species of liquid polysulfide, bifunctional epoxy compound, polyfunctional epoxy compound and filler and their amounts used were as shown in Table 10. Otherwise in the same manner as Example A1, were prepared sealant sheets according to Examples K1 and K2. The resulting sealant sheets both had storage moduli G' falling within the range of 0.005 MPa to 0.8 MPa.

Each sealant sheet was allowed to cure in the same manner as in Experiment 1 and the breaking strength and elongation at break of the cured material were determined. The results are shown in Table 10. Table 10 also shows the results of the sealant sheet of Example H1 obtained in Experiment 8.

TABLE 10

| | | Example | | |
|---|---|---|---|---|
| | | K1 | H1 | K2 |
| Liquid polysulfide (pts) | LP-55 | 90 | 90 | 90 |
| Bifunctional epoxy compound (pts) | jER806 | 6.3 | 6.3 | 6.3 |
| Polyfunctional epoxy compound (pts) | jER152 | 2 | 2 | 2 |
| Epoxy/thiol ratio | | 1.1 | 1.1 | 1.1 |
| Filler (pts) (% by weight in entire sheet) | Talc 2.5 μm | 20 (17 wt %) | 30 (23 wt %) | 50 (34 wt %) |
| Evaluation of cured material | Breaking strength (MPa) | 1.35 | 1.66 | 2.01 |
| | Elongation at break (%) | 320 | 310 | 285 |

The sealant sheets according to this Experiment all showed good shape-holding properties and handling properties as well. With increasing filler content, the breaking strength showed a tendency to increase.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST 21 sealant sheet
21A first face
21B second face
31, 32 release liners
100, 200 release-lined sealant sheets

The invention claimed is:

1. A sealant sheet formed as a sheet, comprising an epoxy group-containing polysulfide having a disulfide structure and an epoxy group in its molecule,
wherein the epoxy group-containing polysulfide is a reaction product of an epoxy compound having two or more epoxy groups in one molecule and a thiol group-containing polysulfide having a disulfide structure and a thiol group in one molecule,
wherein the epoxy group-containing polysulfide is the reaction product of an epoxy compound having two or more epoxy groups in one molecule and a thiol group-containing polysulfide having a disulfide structure and a thiol group in one molecule, wherein the epoxy compound is a combination of bifunctional epoxy compound and polyfunctional epoxy compound,
a ratio (epoxy/thiol ratio) of the total number of epoxy groups in the epoxy compound to the total number of thiol groups in the thiol group-containing polysulfide is 1.0 or higher and below 2.0, and
the sealant sheet has a storage modulus of 0.005 MPa or greater and 0.8 MPa or less at 25° C.

2. The sealant sheet according to claim 1, having a thickness of 0.01 mm or greater and 10 mm or less.

3. The sealant sheet according to claim 1, wherein the epoxy group-containing polysulfide is a reaction product of an epoxy compound having two or more epoxy groups in one molecule and a thiol-terminated polysulfide as the thiol group-containing polysulfide, with the thiol-terminated polysulfide having the disulfide structure in its main chain and having a weight average molecular weight of 500 to 10000.

4. The sealant sheet according to claim 1, comprising, as the bifunctional epoxy compound, an epoxy compound having a five-membered or larger carbon ring structure in its molecule.

5. The sealant sheet according to claim 1, comprising a novolac epoxy resin as the polyfunctional epoxy compound.

6. The sealant sheet according to claim 1, further comprising a filler.

7. The sealant sheet according to claim 6, wherein the filler has a mean particle diameter of 0.1 μm or greater and 30 μm or less.

8. The sealant sheet according to claim 6, wherein the filler accounts for 15% by weight or more and 40% by weight or less of the entire sealant sheet.

9. The sealant sheet according to claim 6, wherein the filler has a mean particle diameter of 0.1 μm or greater and 4.5 μm or less.

10. A release-lined sealant sheet comprising
the sealant sheet according to claim 1, and
a release liner having a release face in contact with at least one face of the sealant sheet.

11. The release-lined sealant sheet according to claim 10, comprising the release liner as a first release liner having a release face in contact with one face of the sealant sheet, and further comprising a second release liner having a release face in contact with the other face of the sealant sheet.

12. A sealant sheet formed as a sheet, comprising an epoxy group-containing polysulfide having a disulfide structure and an epoxy group in its molecule,
wherein the epoxy group-containing polysulfide is a reaction product of an epoxy compound having two or more epoxy groups in one molecule and a thiol group-containing polysulfide having a disulfide structure and a thiol group in one molecule,
the epoxy compound is a combination of bifunctional epoxy compound and polyfunctional epoxy compound,
the thiol group-containing polysulfide has a weight average molecular weight of above 3000 and 10000 or lower, and
the sealant sheet has a storage modulus of 0.005 MPa or greater and 0.8 MPa or less at 25° C.

* * * * *